US007254645B2

(12) United States Patent
Nishi

(10) Patent No.: US 7,254,645 B2
(45) Date of Patent: Aug. 7, 2007

(54) QUALITY ASSURED NETWORK SERVICE PROVISION SYSTEM COMPATIBLE WITH A MULTI-DOMAIN NETWORK AND SERVICE PROVISION METHOD AND SERVICE BROKER DEVICE

(75) Inventor: Koji Nishi, Tokyo (JP)

(73) Assignee: Nec Corporation, Tokyo (JP)

( * ) Notice: Subject to any disclaimer, the term of this patent is extended or adjusted under 35 U.S.C. 154(b) by 577 days.

(21) Appl. No.: 09/818,955

(22) Filed: Mar. 27, 2001

(65) Prior Publication Data

US 2001/0027484 A1    Oct. 4, 2001

(30) Foreign Application Priority Data

Mar. 30, 2000 (JP) ............................. 2000-095393

(51) Int. Cl.
 G06F 15/16  (2006.01)
 G06F 15/173 (2006.01)

(52) U.S. Cl. .................. 709/249; 709/223; 709/226; 709/238; 709/230

(58) Field of Classification Search .................. None
 See application file for complete search history.

(56) References Cited

U.S. PATENT DOCUMENTS

| 5,329,619 | A  | * | 7/1994  | Page et al. ................. 709/203 |
| 5,664,102 | A  | * | 9/1997  | Faynberg .................... 709/246 |
| 5,959,985 | A  | * | 9/1999  | Freen et al. ................. 370/351 |
| 6,064,666 | A  | * | 5/2000  | Willner et al. ............... 370/352 |
| 6,289,201 | B1 | * | 9/2001  | Weber et al. ............... 455/13.1 |
| 6,330,586 | B1 | * | 12/2001 | Yates et al. ................. 709/201 |
| 6,480,861 | B1 | * | 11/2002 | Kanevsky et al. ...... 707/103 Y |
| 6,516,350 | B1 | * | 2/2003  | Lumelsky et al. .......... 709/226 |
| 6,529,499 | B1 | * | 3/2003  | Doshi et al. ................. 370/352 |
| 6,594,279 | B1 | * | 7/2003  | Nguyen et al. ............. 370/468 |
| 6,594,700 | B1 | * | 7/2003  | Graham et al. ............. 709/230 |

(Continued)

FOREIGN PATENT DOCUMENTS

JP         7-203022        8/1995

(Continued)

OTHER PUBLICATIONS

Japanese Office Action dated Mar. 30, 2004 (and English translation of relevant portion).

(Continued)

*Primary Examiner*—Bunjob Jaroenchonwant
*Assistant Examiner*—Dohm Chankong
(74) *Attorney, Agent, or Firm*—Dickstein, Shapiro, LLP.

(57) ABSTRACT

The invention provides quality assured network services in a multi-domain network and comprises a network service management device for managing device clusters incorporated within the operations management network of each provider network and receiving service orders, and a multi-domain service broker for providing a broker function for achieving agreement between a plurality of providers, and the multi-domain service broker further comprises a device for collecting domain information and information relating to the services each provider is able to provide from the network service management devices, and a device which on receipt of a network service request from a customer, extracts the network service management device of the domain which is able to satisfy the required quality level, and then issues instructions for the setting of the required information within the extracted network service management device.

4 Claims, 10 Drawing Sheets

U.S. PATENT DOCUMENTS

| | | | | |
|---|---|---|---|---|
| 6,621,895 | B1 * | 9/2003 | Giese | 379/201.03 |
| 6,631,122 | B1 * | 10/2003 | Arunachalam et al. | 370/332 |
| 6,744,767 | B1 * | 6/2004 | Chiu et al. | 370/395.21 |
| 6,910,024 | B2 * | 6/2005 | Krishnamurthy et al. | 705/400 |
| 7,043,225 | B1 * | 5/2006 | Patel et al. | 455/405 |

FOREIGN PATENT DOCUMENTS

| | | |
|---|---|---|
| JP | 8-274874 | 10/1996 |
| JP | 11-32085 | 2/1999 |
| JP | 11-501495 | 2/1999 |
| JP | 2952306 | 7/1999 |
| JP | 11-296490 | 10/1999 |
| JP | 11-331907 | 11/1999 |
| WO | WO 00/01117 | 1/2000 |

OTHER PUBLICATIONS

Nakamura et al., "A Study on Multimedia Service Composition Mechanism", The Institute of Elecronics, Information and Communication Engineers, Technical Report of IEICE, SSE95-176, IN95-120, pp. 1-6 (1996).

Nakamura et al., "A Pricing and Accounting Software Architecture for QoS Guaranteed Services on the Multi-Domain Network", The Institute of Electronics, Information and Communication Engineers, IEICE Technical Report, vol. J82-B, No. 5, pp. 750-758 (1999).

* cited by examiner

Fig. 8

| Service status | Description |
|---|---|
| Undefined | Status prior to service receipt |
| Accepted | Status indicating service received |
| Intra domain Allocating | Status during design of an intra domain route |
| Intra domain Allocated | Status following successful intra domain route design |
| Intra domain Releasing | Status during release of intra domain route |
| Provisioning | Status during policy provisioning |
| Provisioned | Status following successful policy provisioning |
| Unprovisioning | Status during policy unprovisioning |

Fig. 9

Logic for deciding on either an internal or an external forward destination (Logic L1) If the current domain is the source domain AND the service status is "Accepted" AND the inter domain route is not designed, transfer to the external system.

(Logic L2) If the current domain is the source domain AND the service status is "Accepted" AND the inter domain route has already been designed, transfer to the internal system.

(Logic L3) If the service status from the source domain to the current domain is "Intra domain Allocated" AND the service status from the downstream domain to the destination domain is "Undefined", transfer to the external system.

(Logic L4) If the current domain is not the source domain AND the service status of the current domain is "Accepted" AND the operation result is "Undefined", transfer to the internal system.

(Logic L5) If the current domain is not the source domain AND the service status of all the domains is "Intra domain Allocated", transfer to the external system.

(Logic L6) If the current domain is the source domain AND the service status of all the domains is "Intra domain Allocated", transfer to the internal system.

(Logic L7) If the service status from the source domain to the current domain is "Provisioned" AND the service status from the downstream domain to the destination domain is "Intra domain Allocated" AND the operation result for the downstream domain is "Undefined", transfer to the external system.

(Logic L8) If the service status from the source domain to the upstream domain is "Provisioned" AND the service status from the current domain to the destination domain is "Intra domain Allocated" AND the operation result for the current domain is "Undefined", transfer to the internal system.

(Logic L9) If there are multiple domains AND the current domain is not the source domain AND the service status of all the domains is "Provisioned", transfer to the external system.

(Logic L10) If there are multiple domains AND the current domain is the source domain AND the service status of all the domains is "Provisioned", transfer to the internal system.

Fig. 10

Logic for deciding an external forward destination (Logic L11) If the current domain is the source domain AND the service status is "Accepted" AND the inter domain route is not designed, transfer to inter domain route design.

(Logic L12) If the current domain is not the destination domain AND the service status from the source domain to the current domain is "Intra domain Allocated" AND the service status from the downstream domain to the destination domain is "Undefined", transfer to admission control decision.

(Logic L13) If the current domain is not the source domain AND the service status of all the domains is "Intra domain Allocated", transfer to service provisioning request transmission.

(Logic L14) If the current domain is not the destination domain AND the service status from the source domain to the current domain is "Provisioned" AND the service status from the downstream domain to the destination domain is "Intra domain Allocated" AND the operation result for the downstream domain is "Undefined", transfer to service provisioning request transmission.

(Logic L15) If the current domain is not the source domain AND the service status of all the domains is "Provisioned", transfer to service provisioning response transmission.

Fig. 11

Logic for deciding an intra domain forward destination (Logic L31) If the current domain is the source domain AND the service status is "Accepted" AND the inter domain route is already designed AND the operation result for the current domain is "Undefined", transfer to intra domain route design.

(Logic L32) If the current domain is the source domain AND the service status of all the domains is "Intra domain Allocated", transfer to provisioning.

(Logic L33) If the service status from the source domain to the upstream domain is "Provisioned" AND the service status from the current domain to the destination domain is "Intra domain Allocated" AND the operation result for the current domain is "Undefined", transfer to provisioning.

(Logic L34) If the current domain is the source domain AND the service status of all the domains is "Provisioned", then finish processing.

QUALITY ASSURED NETWORK SERVICE PROVISION SYSTEM COMPATIBLE WITH A MULTI-DOMAIN NETWORK AND SERVICE PROVISION METHOD AND SERVICE BROKER DEVICE

BACKGROUND OF THE INVENTION

1. Field of the Invention

The present invention relates to a quality assured network service provision system, a service provision method, and a service broker device for providing a quality assured network service across a plurality of domains managed by different providers.

2. Description of the Related Art

As the Internet has developed, an increasing number of network service providers are providing network services. Against this background, a network service capable of ensuring the end to end quality demanded by customers across a plurality of networks interconnected between different providers has been keenly sought.

Examples of systems for interconnecting a plurality of this type of communication network are disclosed in the Japanese Unexamined Patent Application, First Publication No. Hei-08-274874 entitled "Network Interconnection Device and Method", and the Published Japanese translation No. 11-501495 of PCT International Publication entitled "Network Link for Interconnecting Service Control Points of Traffic Management Control Load Distribution Groups".

In a network connection method disclosed in the Japanese Unexamined Patent Application, First Publication No. Hei-08-274874, elements within different electrical communication networks are interconnected, and a mediated access processor (MAP) is provided for connecting an intelligent network for providing service across network boundaries. This MAP enables the conversion, inspection and emulation of messages exchanged between networks, and provides a transparent electrical communication network in which users need not change existing interfaces and protocols.

Furthermore, in the Published Japanese translation No. 11-501495 of PCT International Publication, in order to overcome problems associated with elements of a network becoming overloaded in network environments incorporating a plurality of service providers and multi-vendor devices, an interconnection function is provided by a direct network link between two service control points (SCP) which are used in a load distribution mode.

This network link involves interconnecting two SCPs within a load distribution group, and as a result offers a method for controlling the SCPs to not only exchange information relating to congestion levels and control functions, but also send queries to an SCP which is not overloaded.

However, the following problems arise with the conventional technology described above. Namely, in the technique disclosed in the Japanese Unexamined Patent Application, First Publication No. Hei-08-274874, absolutely no consideration is given to operations for provisioning the two interconnected electrical communication networks and providing network services, and so a network service of guaranteed quality cannot be provided via this type of interconnected network.

Furthermore, the invention disclosed in the Published Japanese translation No. 11-501495 of PCT International Publication simply provides a method for dealing with a network overload, and even in such cases is unable to provide a network service in which the customer is guaranteed sufficient quality.

In addition, operation information for provisioning the interconnected communication networks and providing network services is not exchanged, and no mechanism is provided for the consistent provision of service form the interconnected network. Moreover, a SCP within a communication device uses a great deal of resources including the CPU, and because a shift to high performance is needed in order to manage the plurality of control function lists, the cost of communication devices deployed within the network increases, and increases in processing loading also become problematic.

In this manner, conventional networks comprise a plurality of network service providers, and because sufficient consideration has not been given to the provision of uniform quality across the network, there is no option but to provide high performance devices for exchanging information individually within each communication network, and consequently conventional networks have been plagued by problems such as a lack of network expandability and a lack of connection flexibility.

SUMMARY OF THE INVENTION

The present invention takes the problems inherent in the conventional technology into account, with an object of providing a network service which guarantees the level of quality required by the customer through a plurality of networks operated by different providers, and moreover by incorporating a dedicated service broker device (hereafter referred to as a multi-domain service broker) for managing information which can be provided between providers and designing routes for spanning provider networks, aims to provide a system which is able to achieve function distribution and a high level of expandability.

A quality assured network service provision system compatible with a multi-domain network according to the present invention is a communication network comprising a plurality of operations management networks (domains) which are connected to a plurality of customer networks with user terminals and which are managed by different providers, which further incorporates a network service management device for managing collectively device clusters incorporated within the operations management network of each provider and receiving service orders and faults information from customers, and a multi-domain service broker at the functional host layer of the network service management device for providing a broker function for enabling agreement between a plurality of providers.

Moreover, the network service management device comprises information on services which can be provided by each provider, and a device for outputting domain information to the multi-service broker, and the multi-service broker comprises devices for storing output information received from each network service management device, receiving requests for network service from customers and providing a broker function for achieving agreement between a plurality of providers, selecting the network service management device of a domain which will satisfy the required quality level, and issuing commands for introducing, and then setting, the information necessary for the selected network service management device.

A first effect of the present invention is the ability to provide a quality assured network service across a plurality of domains managed by different providers. The reason such an effect is achievable is that not only does a design server calculate a communication route within each domain which will satisfy the required level of quality, but that by the exchange of request and response messages between bandwidth brokers, a communication route can be calculated through a plurality of domains. Moreover, the inter domain communication quality is guaranteed by the bandwidth brokers managing the available resource between the domains.

A second effect is that system maintenance and version upgrades of the customer care server, the policy server, the design server, the network management devices and the workflow server is simple. The reason this effect is achievable is that because only the bandwidth brokers have an interface section with the different providers, it is unlikely that any alterations to the aforementioned servers will have repercussions on the bandwidth brokers.

A third effect is that the systems of the customer care server, the policy server, the design server, the network management devices and the workflow server can be concealed from other providers. The reason this effect is achievable is that because only the bandwidth brokers have an interface section with the different providers, the only processing visible from an external provider is the interface provided by the bandwidth broker.

A fourth effect is that an inter domain route from the customer network of the source network to the destination network can be calculated quickly, and furthermore need not be managed by each of the providers. The reason this effect is achievable is that the multi-domain service broker, by managing the service information for all of the associated domains, is able to output the domain cluster which links the source network where the request originated with the destination network.

BRIEF DESCRIPTION OF THE DRAWINGS

FIG. 8 is a description of the status labels for the transition diagram of service status.

FIG. 9 is a table of logic for deciding on either an internal or an external forward destination.

FIG. 10 is a table of logic for deciding an external forward destination.

FIG. 11 is a table of logic for deciding an intra domain forward destination.

DETAILED DESCRIPTION OF THE INVENTION

An object of the present invention is to provide, for a multi-domain network comprising operations management networks (domains) operated by a plurality of network service providers, a network service which guarantees the quality of communication required by a customer in the provision of network services, from end to end, namely from the customer who initiated the request through to the customer at whom the request is directed.

Then, by introducing a multi-domain service broker for collecting information between the network service management devices provided in each domain, promoting interconnectivity, and brokering the necessary services, a seamless network service provision system can be realized, even between different domains.

Figure 1:
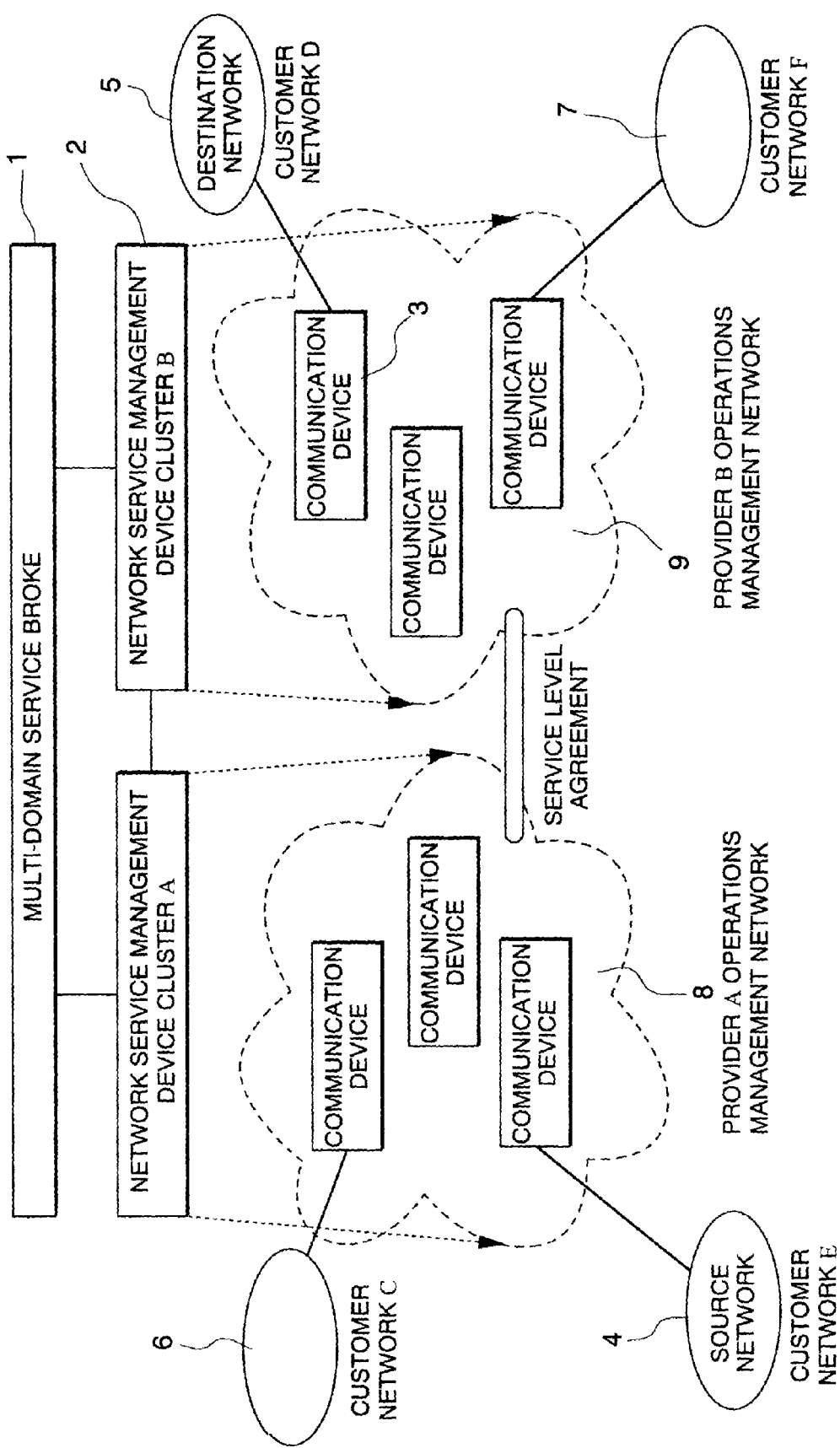
FIG. 1 is a structural diagram of a multi-domain network.

As follows is a description of the construction of an embodiment of the present invention with reference to the drawings. FIG. 1 is a structural diagram showing a multi-domain network of the embodiment of the present invention, and comprises a plurality of customer networks and a plurality of provider networks. A multi-domain network is a configuration in which customer networks positioned in mutually remote locations are able to communicate with one another via a plurality of provider operations management networks. Specific examples include the case of a network between a head office and a branch office, or the case where affiliated companies create an extranet.

In the example shown in FIG. 1, operations management networks of different providers, namely an operations management network 8 of a provider A and an operations management network 9 of a provider B exist between a customer network E and a customer network D, and each operations management network incorporates a plurality of communication device clusters 3 for performing the processing for the relayed transmission of data.

In this embodiment, the provision of a service for sending data from the customer network E to the customer network D is taken as an example, and the customer network E is termed the source network 4, and the customer network D the destination network 5.

In order for the communication quality required by the customer to be satisfied from the source network 4 through to the destination network 5, it is also necessary for both of the intermediate providers A, B to also meet the required communication quality standards of the customer. Here, the term communication quality refers to factors such as delays, fluctuations and bandwidth relating to data traffic. Consequently, negotiations and cooperative operations are necessary between the provider A and the provider B to agree on communication quality. Furthermore, in order to detect the status of the communication device clusters 3 within each provider, and perform setting and control of specific information, a network service management device 2 is deployed at the functional host layer of the operations management network of each provider A, B.

(1) Network Service Management Device

The network service management devices 2 perform management operations such as the management of network configurations, fault management, performance management, security management, customer management and service management, and in particular manage the status of the network within the operations management network and receive service orders and fault reports and the like from customers.

Figure 2:
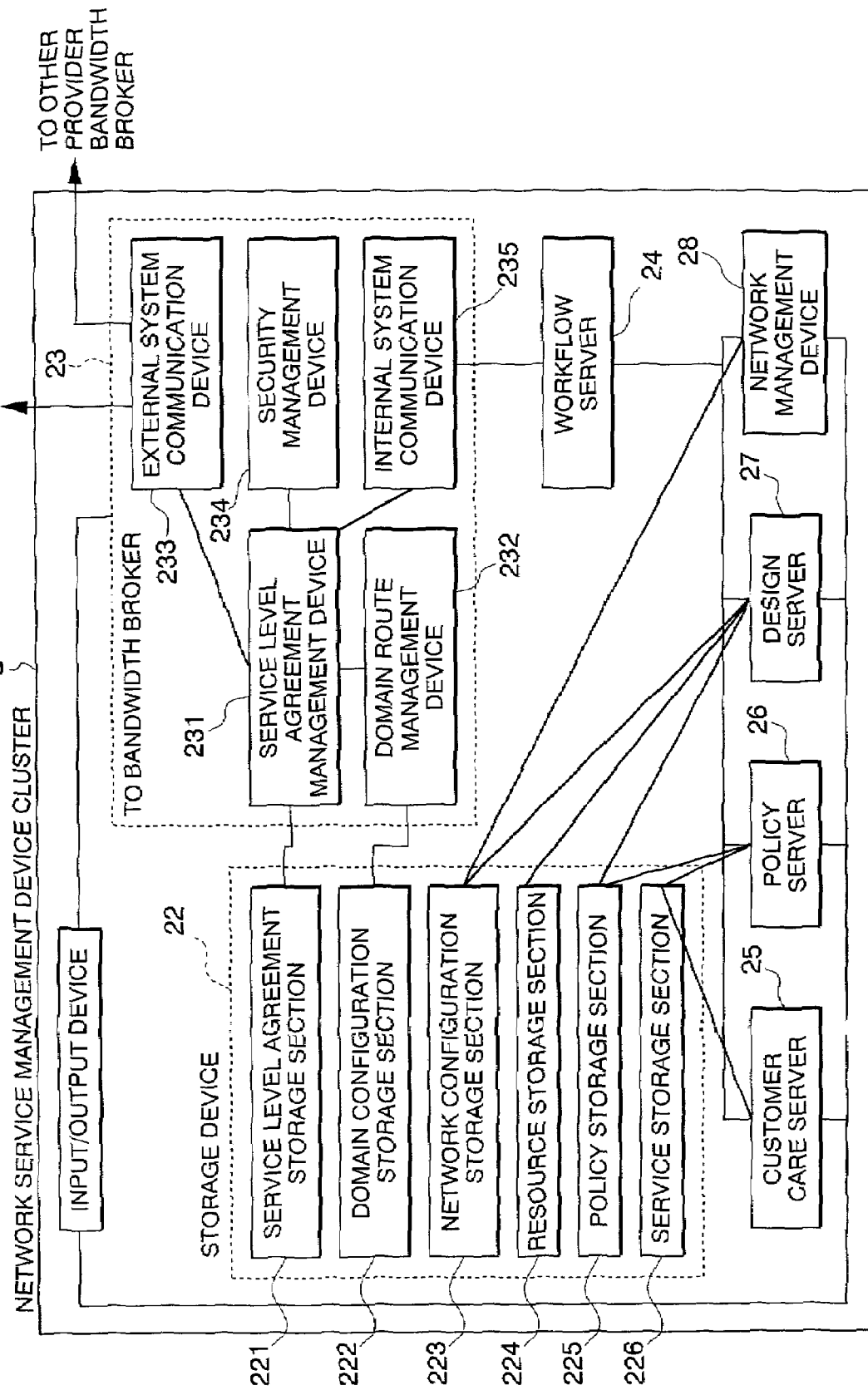
FIG. 2 is a block diagram showing the functions of a network service management device.

FIG. 2 is a block diagram showing the functions of a network service management device. As shown in the diagram, the network service management device incorporates a variety of device clusters for providing internet connection services, and managing customer information, network information, and provider information. The major components include an input and output device 21 such as a keyboard or a display to enable the operations manager of the provider to input information relating to the services provided by the provider and domain information such as information relating to the operations management network configuration of the provider, a storage device 22 for storing input information on the basis of information type, a workflow server 24 for determining the internal or external forward destination for each processing command, as well as a bandwidth broker 23 for performing registrations of domain information and service information with the multi-domain service broker and cooperating with the workflow server 24 in determining the subject for executing the next process, and internal processing servers such as a customer care server 25 for performing processing within the network service management device, a policy server 26, a design server 27, and a network management device 28.

As follows is a description of the storage device 22, the bandwidth broker 23, the workflow server 24, and each of the various internal processing servers inside the network service management device 2.

Storage Device

The storage device 22 inside the network service management device 2 is a device for storing information on the services provided by the provider and domain information such as information on the configuration of the operations management network offered by the provider, and comprises the following plurality of storage sections for storing each piece of information on the basis of information type; namely, a service level agreement storage section 221, a domain configuration storage section 222, a network configuration storage section 223, a resource storage section 224, a policy storage section 225 and a service storage section 226.

In this embodiment, a service level agreement storage section 221 is a device for storing agreement information once provider A has reached an agreement with provider B relating to network service, although this issue is described below in further detail. This agreement information includes information relating to communication devices for linking the operations management networks of the provider A and provider B, as well as information on the identification data and type of the circuitry linking the communication devices, information relating to types of service and data traffic profiles, and information on the available hours for the agreement.

The data traffic profile information incorporates information on bandwidth and communication quality, and for example describes information for providing high priority communication quality in the case where communication data traffic is no more than 10 Mbps, and canceling the communication data when the traffic is greater than 10 Mbps.

The domain configuration storage section 222 stores domain configuration information for providing network service to customers. Domain configuration information refers to configuration information relating to the operations management network of the provider. For instance, in the example shown in FIG. 1, the route from the customer network of the source network through to the customer network of the destination network passes through the operations management network of the provider A and the operations management network of the provider B. In such a case, the link between the operations management network of the provider A and the operations management network of the provider B is stored in the domain configuration storage section 222 as a provider network necessary for providing service.

The network configuration storage section 223 stores information relating to the communication device clusters 3 inside the operations management network of the provider and the circuitry for linking these communication device clusters 3. The resource storage section 224 stores information relating to the communication devices 3 inside the operations management network of the provider, and includes information such as the total resource capacity, the used resource capacity, and the available resource capacity of each of the communication devices 3. Here, the term resource typically describes the power of the CPU, the memory capacity, and the circuitry bandwidth of the communication device 3. In this embodiment, resources are stored relating to the circuitry bandwidth, although other information could also be stored.

The policy storage section 225 stores policy which functions as the information for performing settings in the communication devices 3 of the operations management network of the provider. Here, policy refers to the information which should be set in the communication devices 3 for providing network service to a customer, expressed in a manner which is easily understood by an operator, and is described in expressions which are independent of the vendor of the communication device 3. For example in FIG. 1, the expression guaranteeing high priority communication data transfer from the customer network E to the customer network D for values of no more than 10 Mbps is one example of this type of policy. The service storage section 226 stores customer information and service information received from customers, such as the service order information describing content guaranteeing high priority communication data transfer from the customer network E to the customer network D for values of no more than 10 Mbps.

Bandwidth Broker

Next is a description of the configuration of a bandwidth broker. The bandwidth broker 23 is a system with a data processing function operated by program control, and comprises an external system communication device 233, a security management device 234, a service level agreement management device 231, a domain route management device 232, and an internal system communication device 235.

In this embodiment, the external system communication device 233 is connected to the network service management device cluster 2 of an external system, and to a multi-domain service broker 1, and provides an interface for communicating with these external systems. The security management device 234 ensures the security of internal systems when communication with an external system is conducted. For example, following connection to an external system, the security management device 234 receives authentication information from the external system, and then only permits information exchange to occur following successful authentication.

The service level agreement management device 231 registers the service information agreed upon between the providers in the service level agreement storage section 221, and also manages such information. Furthermore, the service level agreement management device 231 also provides an interface for registering, editing and deleting service level agreement information input via the output device 21.

The domain route management device 232 registers the domain linking information necessary for providing network service to customers in the domain configuration storage section 222, and also manages such information. The internal system communication device 235 provides an interface for the bandwidth broker 23 and the workflow server 24 to communicate.

The workflow server 24, like the bandwidth broker 23, is a system with a function for processing data which is operated by program control, and is connected to the bandwidth broker 23, the customer care server 25, the design server 27, the policy server 26, and the network management device 28 respectively. The workflow server 24 sends the necessary processing commands to each server and manages the progress of the commands in accordance with a workflow and an operation flow defined by the provider.

Internal Processing Server Cluster

Next is a description of the remaining customer care server 25, the policy server 26, the design server 27 and the network management device 28 which make up the internal processing server cluster for processing and controlling specific settings within the network incorporating the communication devices.

The customer care server 25 is a system with a data processing function operated by program control, and is connected to the workflow server 24. The customer care server 25 manages service order information received from customers, and performs the registering of customer information and service information received from customers in the service storage section 226. Furthermore, the customer care server 25 also provides an interface for the aforementioned service storage section 226 for registering, editing and deleting service information input via the output device 21.

The design server 27 is also a system with a data processing function operated by program control, and is connected to the workflow server 24. The design server 27 manages the internal network resources of the operations management network of the provider, and in the case of this embodiment, manages the total bandwidth, the used bandwidth, and the available bandwidth of the network circuitry.

When the resource usage status changes, the design server 27 updates the information in the resource storage section 224, and reads the information from the network configuration storage section 223 in order to refer to the topology information of the operations management network of the provider, thereby always managing the most up to date network resource information. Furthermore, the design server 27 also performs processing for registering policy information as a resource usage plan output in the policy storage section 225.

The policy server 26 is a system with a data processing function operated by program control, and is connected to the workflow server 24. The policy server 26 reads policy information stored in the policy storage section 225, and converts the policy information into setting information for a communication device 3 specific to a vendor. The policy server 26 then performs provisioning of the communication device 3 in order to enable the provision of service.

The network management device 28 is a system with a data processing function operated by program control, and is connected to the workflow server 24. The network management device 28 provides a network fault management function for the configuration and open channel and the like incorporating both the communication devices 3 within the operations management network of the provider, and the connection configuration of the circuitry for connecting these communication devices.

A network service management device according to the configuration described above provides the necessary information to a multi-domain service broker which provides a broker function for connections between providers, and also provides functions for performing actual settings and control operations on communication devices, based on information supplied from the multi-domain service broker.

(2) Multi-domain service broker

As follows is a description of the multi-domain service broker 1. The multi-domain service broker 1 is positioned at the functional host level of the network service management device 2, and provides a broker function for achieving agreement between a plurality of providers.

Figure 3:
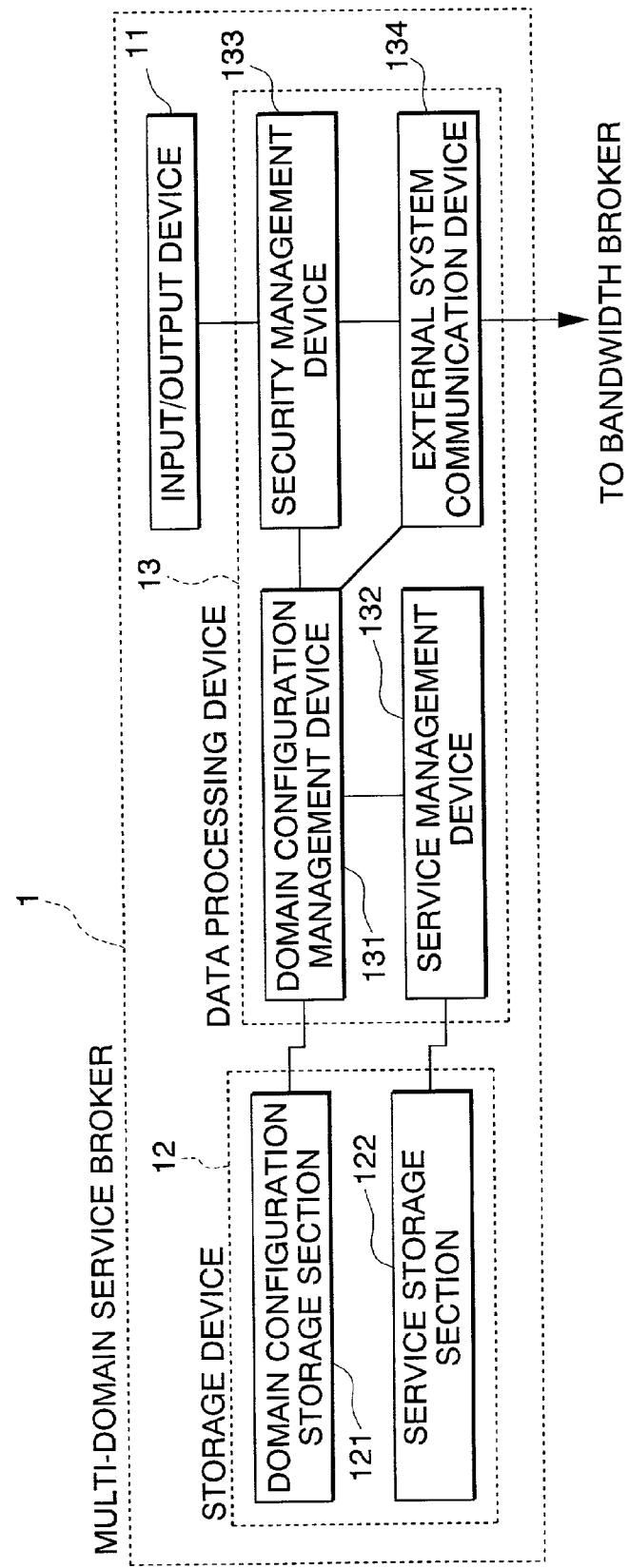
FIG. 3 is a block diagram showing the functions of a multi-domain service broker.

FIG. 3 is a block diagram showing the functions of the multi-domain service broker 1. As is shown in FIG. 3, the multi-domain service broker 1 comprises an input and output device 11 made up of components such as a keyboard and a display, a data processing device 13 which is operated under program control, and a storage device 12 for storing information.

The input and output device 11 is connected to a security management device 133, and is able to perform operations for registering, converting and deleting authentication information and the like used for communications with the network service management device clusters 2 of the providers managed by the multi-domain service broker 1. The storage device 12 comprises a domain configuration storage section 121 and a service storage section 122. The domain configuration storage section 121 stores information on the operations management networks of the providers managed by the multi-domain service broker 1 as well as the corresponding connection configurations. In the case of the present embodiment, the operations management networks of the provider A and the provider B are managed by the multi-domain service broker 1.

The service storage section 122 stores the services provided by each of the providers. In the case of the present embodiment, this includes network services of high quality, medium quality and low quality for both providers A, B. The data processing device 13 comprises a domain configuration management device 131, a security management device 133, a service management device 132 and an external system communication device 134.

The domain configuration management device 131 provides operations relating to the provider operations management networks managed by the multi-domain service broker 1, and provides functions for registering, editing and deleting domain configuration information in the domain configuration storage section 121. The multi-domain service broker 1 stores domain information which has been registered and declared from the providers in the domain configuration storage section 121, via the domain configuration management device 131.

The security management device 133 performs authentication processing of the network service management devices 2 connected to the multi-domain service broker 1. Following confirmation of connection with the network service management device 2, authentication information is received, and if this information is then authenticated by the security management device 133, data exchange with the network service management device 2 proceeds.

The service management device 132 manages the services which each provider is able to provide, and also executes the registering, editing and deleting of service information in the service storage section 122. The external system communication device 134 provides an interface for communication between the multi-domain service broker 1 and the network service management device clusters 2 of each of the providers.

As follows is a description of the operation of the present invention. In the present invention, cooperation between the network service management device clusters 2 operated by different providers, and the multi-domain service broker 1 enables a customer to be provided with a quality assured network service which spans multiple domains. The keys in this cooperation are the bandwidth broker within each of the network service management device clusters 2, and the multi-domain service broker 1.

The sequence for a quality assured network service provision system compatible with a multi-domain network according to the present invention, can be roughly classified into three main stages, (a) a service registration stage, (b) a service agreement stage, and (c) a service provisioning stage. The operation of the embodiment of the present invention will be described below, with reference to the drawings.

(a) Service Registration Stage

The service registration stage is a phase during which the network service management device clusters 2 of each of the providers register with the multi-domain service broker 1, the domain information and the information on services which can be provided by the operations management network. As a result of the processing of this stage, the multi-domain service broker 1 is able to collect and administer the provider information and the service information for all of the connected operations management networks.

Specifically, the processing of this service registration stage involves the operations manager for each provider, namely an operator, using the input and output device 11 and inputting information relating to the services provided by the provider, as well as the domain information comprising configuration information on the operations management network of the provider. The information relating to the services provided by the provider and the domain information input in this manner is transmitted to the multi-domain service broker 1 via the external system communication device 233.

Furthermore, in this embodiment, the case is described where an operator inputs the service information and domain information for each provider, but the input of this information could also be carried out automatically by pre-programmed conditions, or updated automatically by message information exchanged between customers and each network service management device.

When the multi-domain service broker 1 receives, via the external system communication device 134, information relating to the services provided by each provider and the domain information, that received information is stored in the service storage section 122 and the domain configuration storage section 121 respectively of the storage device 12.

Figure 4:
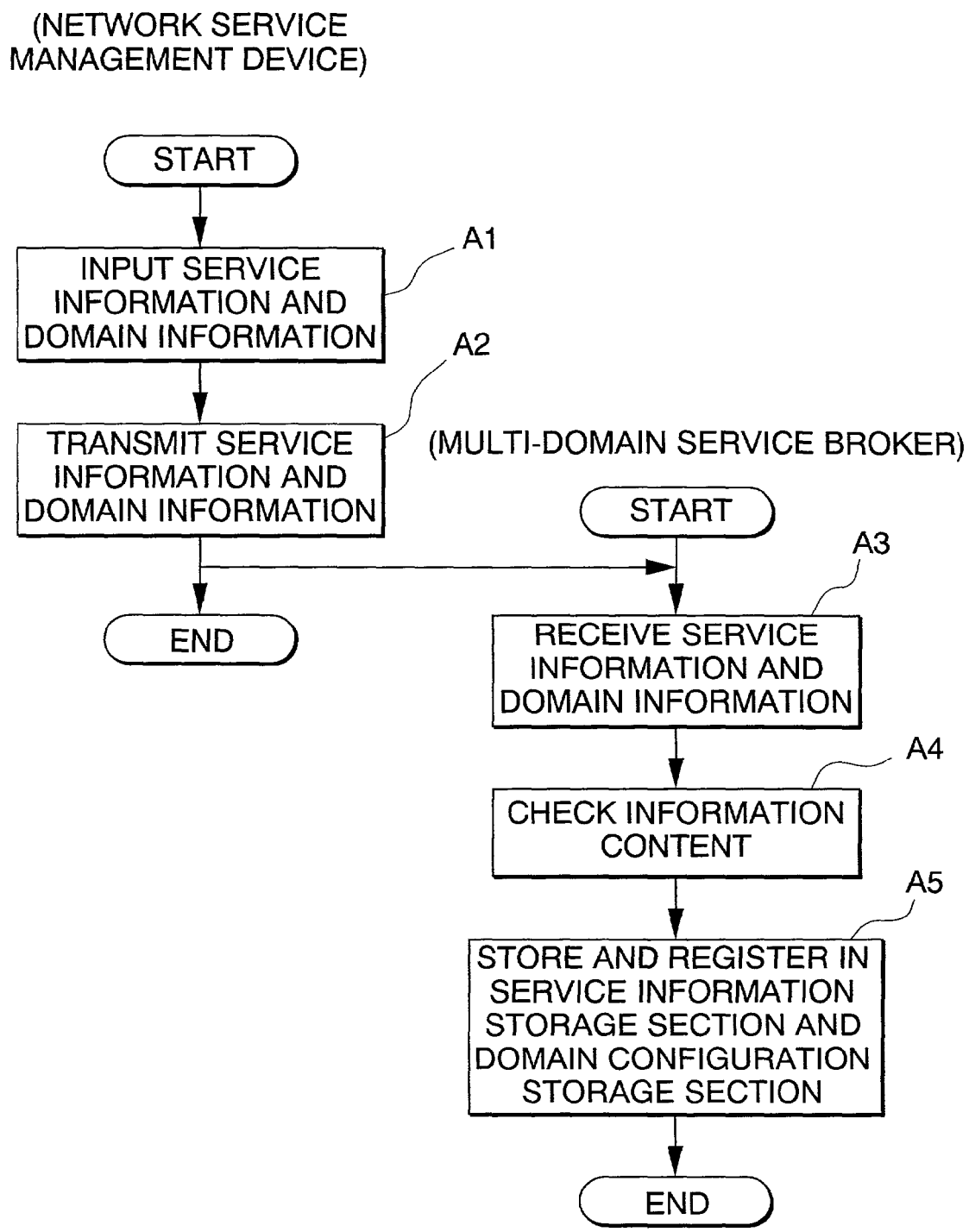
FIG. 4 is a flowchart showing the sequence within a service registration stage of the present invention.

Next, operation of the service registration stage detailed above will be described with reference to FIG. 4. FIG. 4 is a flowchart showing the sequence within the service registration stage of the present invention.

First, before the series of operations begins, the network service management device 2 confirms the management information communication connection with the multi-domain service broker 1, and then following confirmation, the network service management device 2 sends authentication information through the security management device 234, receives authorization for management information exchange with the multi-domain service broker 1, and then forms a logical communication path.

Then, an operations manager or operator uses the input and output device 21 and inputs service information relating to the services the provider A is able to provide, and domain information comprising configuration information for the operations management network of the provider A (step A1). The input service information and domain information is transmitted to the multi-domain service broker 1 via the external system communication device 233 (step A2).

On receipt of the service information and the domain information via the external system communication device 134 (step A3), the multi-domain service broker 1 first performs a check of the information content (step A4), and if the information is grammatically correct, stores the service information and the domain information in the service storage section 122 and the domain configuration storage section 121 respectively (step A5).

In this manner, the multi-domain service broker 1 collects domain information and service information from each network service management device of a plurality of providers, and registers this information internally.

(b) Service Agreement Stage

Next, in relation to the provision of actual network services to a customer, a service agreement stage is described for reaching agreement on services between operations management networks, in order to enable the provision of network services of equal quality at each of the interconnected providers.

This service agreement stage corresponds with processing for reaching an agreement on service level by conducting negotiations between the multi-domain service broker 1 and the network service management device clusters, selecting a suitable domain for satisfying the required quality level, and then determining a corresponding communication route, so that when a request is received from a customer, network services of consistent quality can be provided throughout the multi-domain network.

As follows is a description of the necessity for this agreement on service level. Each provider is able to specify a network quality level based on a variety of parameters such as error rate or delay value, although the level of quality which can be provided, and the method for specifying that level is generally different for different providers. For example, one provider may ask the customer to specify one of three quality levels named Gold, Silver and Bronze, where Gold offers the highest level of quality, whereas another provider may require the customer to specify a quality level based on parameters which may use a different error rate, and may offer a different number of levels (for example, A, B, C, D).

Consequently, in order to ensure that the quality level requested by the customer is maintained at a constant level within a multi-domain service network, this quality level must be associated with one of the service levels offered within each provider, and a mutual agreement then reached. At this stage, the multi-domain service broker 1 functions as the intermediary broker for reaching service agreements between each of the domains.

As follows is a brief description of the operation of this service agreement stage. First, an operator at one provider uses the input and output device 21 of the network service management device 2 and inputs service information detailing the conditions desired for a service level agreement. This input service information is transmitted to the multi-domain service broker 1 via the external system communication device 233. On receipt of the service information, the multi-domain service broker 1 uses the service management device 132 to search the service storage section 122, and acquires a domain ID which satisfies the conditions specified.

Next, the multi-domain service broker 1 uses this domain ID as a key for reading the domain configuration information for that domain from the domain configuration storage section 121, and then transmits this domain information as a response, to the bandwidth broker 23 inside the network service management device cluster 2 where the request originated.

When the network service management device which receives the response is notified of a certain domain by the multi-domain service broker 1, the operator uses the input and output device 21 and inputs the service level agreement information into the bandwidth broker 23.

At this point, this service level agreement information transmits a message, via the external system communication device 233 of the network service management device 2, to the bandwidth broker 23 of the adjacent domain introduced by the multi-domain service broker 1, so that the service level agreement information is also registered in the adjacent domain. The processing outlined above is used to reach agreements relating to interconnectivity between the operations management networks of different providers.

This agreement information includes information on the interconnected communication devices, circuitry, service types, and bandwidths and the like. In this manner, the processing of this service agreement stage involves the exchanging of information and the assigning of service levels relating to the determination of an agreement to enable the provision of network services at the same level of quality across different providers, and results in an agreement relating to service levels between providers.

Figure 5:
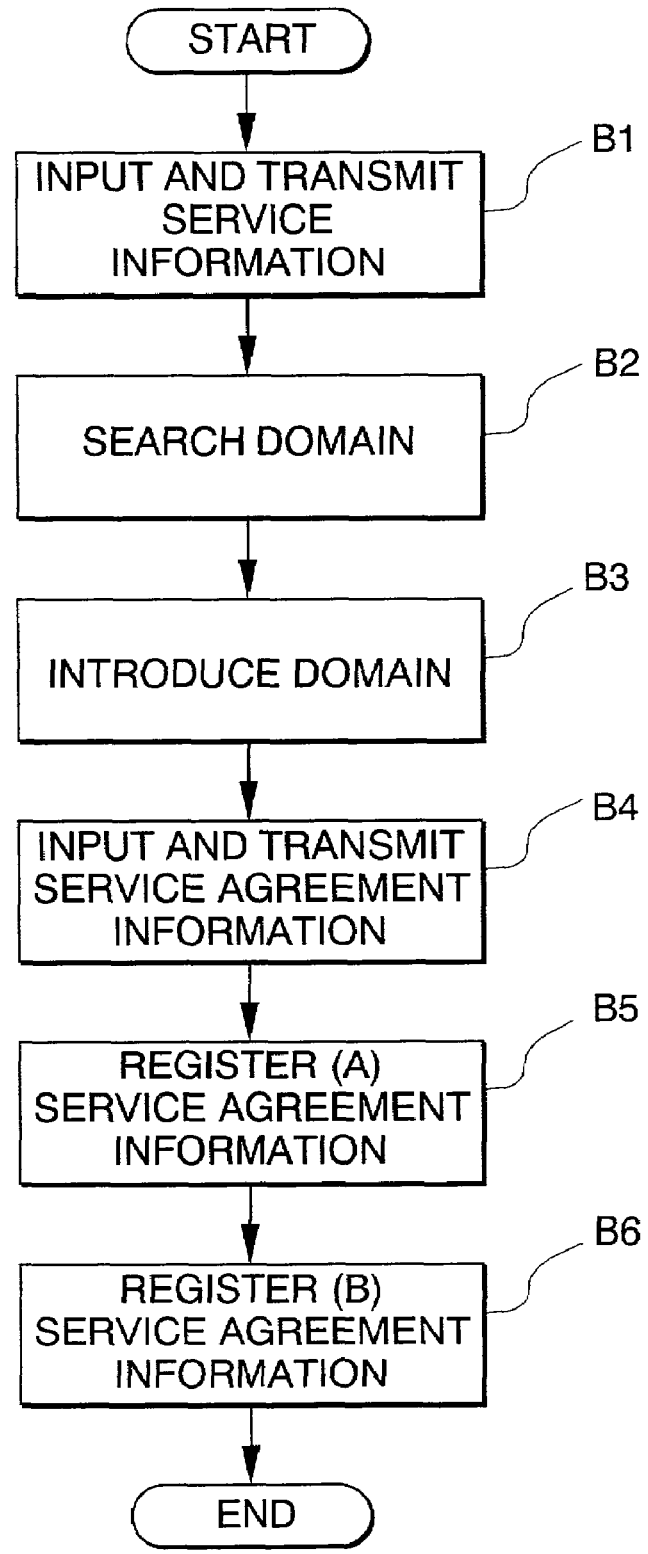
FIG. 5 is a flowchart showing the operations of a service agreement stage of the present invention.

Next is a description of the specifics of the service agreement stage with reference to FIG. 5. The service agreement is made between different providers, and is a convention relating to the interconnectivity between operations management networks.

An operator at the provider A (hereafter referred to as the operator A) uses the input and output device 21 and inputs service information detailing the conditions desired for a service level agreement. This service information includes information such as service classifications for high priority, medium priority and low priority service. This input service information is transmitted to the multi-domain service broker 1 via the external system communication device 233 (step B1).

When the multi-domain service broker 1 receives this service information, the service management device 132 searches the service storage section 122, and acquires a domain ID which satisfies the conditions specified (step B2).

Then, the domain configuration management device 131 uses this domain ID as a key and acquires the domain information from the domain configuration storage section 121. The multi-domain service broker 1 then transmits a response to the bandwidth broker 23 of the provider A (hereafter referred to as the bandwidth broker A) via the external system communication device 134. On receipt of this domain information, the bandwidth broker 23 inputs the domain information into the input and output device 21. In the case of this embodiment, the domain of the provider B (hereafter referred to as the domain B) is introduced (step B3).

The operator A specifies the domain B and inputs the service level agreement information. The service level agreement information includes information on service classes such as high priority, medium priority and low priority service, as well as information on required communication quality. In this embodiment, bandwidth information is input. The service level agreement information is transmitted to the bandwidth broker 23 of the provider B (hereafter referred to as the bandwidth broker B) via the external system communication device 233 (step B4).

Before the transmissions from the above series of processing are conducted, the bandwidth broker A confirms the management information exchange connection with the bandwidth broker B, and receives authentication. This authentication is performed by the security management device 234.

On receipt of the service level agreement information, the bandwidth broker B checks the content of the data. If there are no grammatical errors, then the service level agreement management section 231 inside the bandwidth broker B (hereafter referred to as the service level agreement management section B) acquires information from the service level agreement storage section 221 on the available resource capacity between the domain A and the domain B, and service information relating to high priority, medium priority and low priority service levels. If an agreement is possible, then a response is transmitted to the bandwidth broker A via the external system communication section B, and the service agreement information agreed upon with the provider A is registered in the service level agreement storage section B (step B5).

The bandwidth broker A receives the response, and if the service level agreement request has been accepted, registers that agreement information in the service level agreement storage section A (step B6).

The processing outlined above is used to reach agreement relating to interconnectivity between the operations management networks of the provider A and the provider B. This agreement information includes information on the interconnected communication devices, circuitry, service types, and bandwidths and the like.

(c) Service Provisioning Stage

Next, the service provisioning stage is executed. Service provisioning is a step where, based on a service order from a customer, operations are performed for setting and controlling information in the communication devices so that a service can be operated between customer networks via the operations management networks of a plurality of providers.

This service provisioning stage can be further classified into three stages, namely, service order processing, route design processing, and provisioning processing. These three stages of processing are executed mainly by a customer care server, a design server, and a policy server respectively.

The workflow server 24 controls this cluster of servers in accordance with the operation flows for the provision of network services, and the workflow server 24 also controls the cooperative operation of the customer care server 25, the design server 27, the policy server 26 and the workflow server 24 and the like inside the network service management device of each domain.

In other words, service order processing refers to the processing in the customer care server 25 for receiving and processing service order information received from a customer, and registering that information in the service storage section 226, and route design processing refers to the processing in the design server 27, which manages the internal network resources of the operations management network of the provider, for managing the total bandwidth, the used bandwidth, and the available bandwidth of the network circuitry, and determining an actual route depending on the usage status of the resources. Moreover, the provisioning processing refers to the processing for reading the policy information stored in the policy storage section 225 by using the policy server 26, and converting this information to setting information for a communication device of a specific vendor. Provisioning for providing service refers to control processing performed on a communication device 3.

As follows is a description of processing examples of the service order processing, the route design processing and the provisioning processing from the service provisioning stage.

First, in the case of service order processing, a customer requests a service order from the provider A, and the operator A uses the input and output device 21 of the network service management device 2 to register this service order information in the customer care server 25. The customer care server 25 then stores the information input by the operator A in the service storage section 226.

Next, in the route design processing, processing is performed for designing an inter domain connection route between domains, and for designing an intra domain route within the domain. Of these two, the former is equivalent to the processing for calculating linkages for the operations management networks of the providers positioned between the customer network of the source network through to the destination network, and is carried out by the multi-domain service broker 1. The latter is equivalent to processing for calculating linkages between communication devices 3 within the operations management network of the provider, and is carried out by the design server 27.

First, in order to design an inter domain connection route, the bandwidth broker 23 of the network service management device 2 transmits a request message to the multi-domain service broker 1 via the external system communication device 233.

The multi-domain service broker 1 executes the inter domain route design process, and a response is then transmitted from the multi-domain service broker 1 back to the bandwidth broker 23.

Subsequently, the design server 27 designs an intra domain route which will satisfy the level of communication quality requested. The results of this intra domain route design process executed by the design server 27 are written to the resource storage section 224 and the policy storage section 225.

In the resource storage section 224, the resource information is updated with the newly allocated network resource information produced as a result of the route design process. In the policy storage section 225, the configuration data for setting the communication devices within the network is written as policy.

Next, the service level agreement management device 231 of the bandwidth broker 23 refers to the service level agreement storage section 221, and checks whether or not the service information requested by the customer can be accommodated by a service agreed upon between the provider A and the provider B.

In those cases where the service can be accommodated, the network service management device 2 transmits a provisioning request message to the bandwidth broker 23A of the adjacent domain, via the external system communication device 233.

When the bandwidth broker 23B of the adjacent domain receives the provisioning request, the design server 27 of the network service management device of that adjacent domain calculates an intra domain route which will satisfy the level of communication quality requested.

Then, as a result of this calculation process, the bandwidth broker 23B of this adjacent domain transmits a service provisioning response to the bandwidth broker where the request originated. In this manner, the registration of service orders, and the intra domain and inter domain design processes are executed by the service order processing stage and the route design processing stage.

In the third stage of provisioning processing, the actual setting and control of the configuration information in the appropriate communication devices is conducted, based on the route information and the like designed in the manner descried above. In other words, the policy server 26 reads the configuration data required for the communication devices 3 to provide the service, from the policy storage section 225. Here, the object of the provisioning performed by the policy server 26 is the operations management network of the provider.

Next the bandwidth broker 23A acquires the linkage information for those domains which are passed through in order to provide the service, and then transmits a service provisioning request message to the bandwidth broker 23B of the adjacent domain.

When the bandwidth broker 23B of the adjacent domain receives the service provisioning request message, the policy server 26 reads the policy data for that particular service from the policy storage section 225. Then, provisioning is executed for the communication devices 3 within the operations management network of the domain which relate to that service.

The bandwidth broker 23 of the adjacent domain then transmits a service provisioning response message to the bandwidth broker 23 where the request originated.

On receipt of this service provisioning response message from the adjacent domain, the bandwidth broker 23 finishes processing, and a communication service which passes through a plurality of domains is provided.

Figure 6:
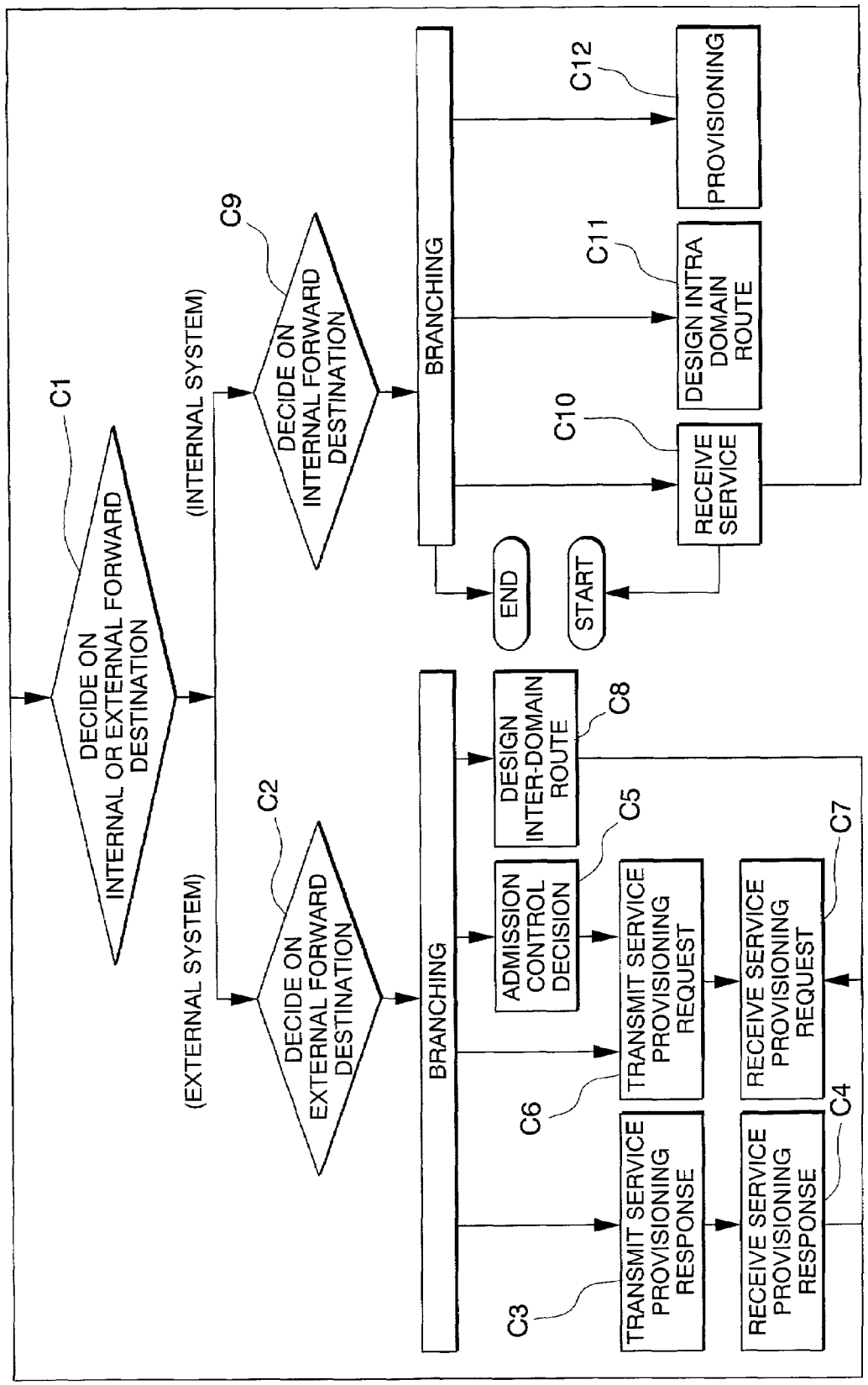
FIG. 6 is a flowchart showing the operations of a service provisioning stage of the present invention.
Figure 7:
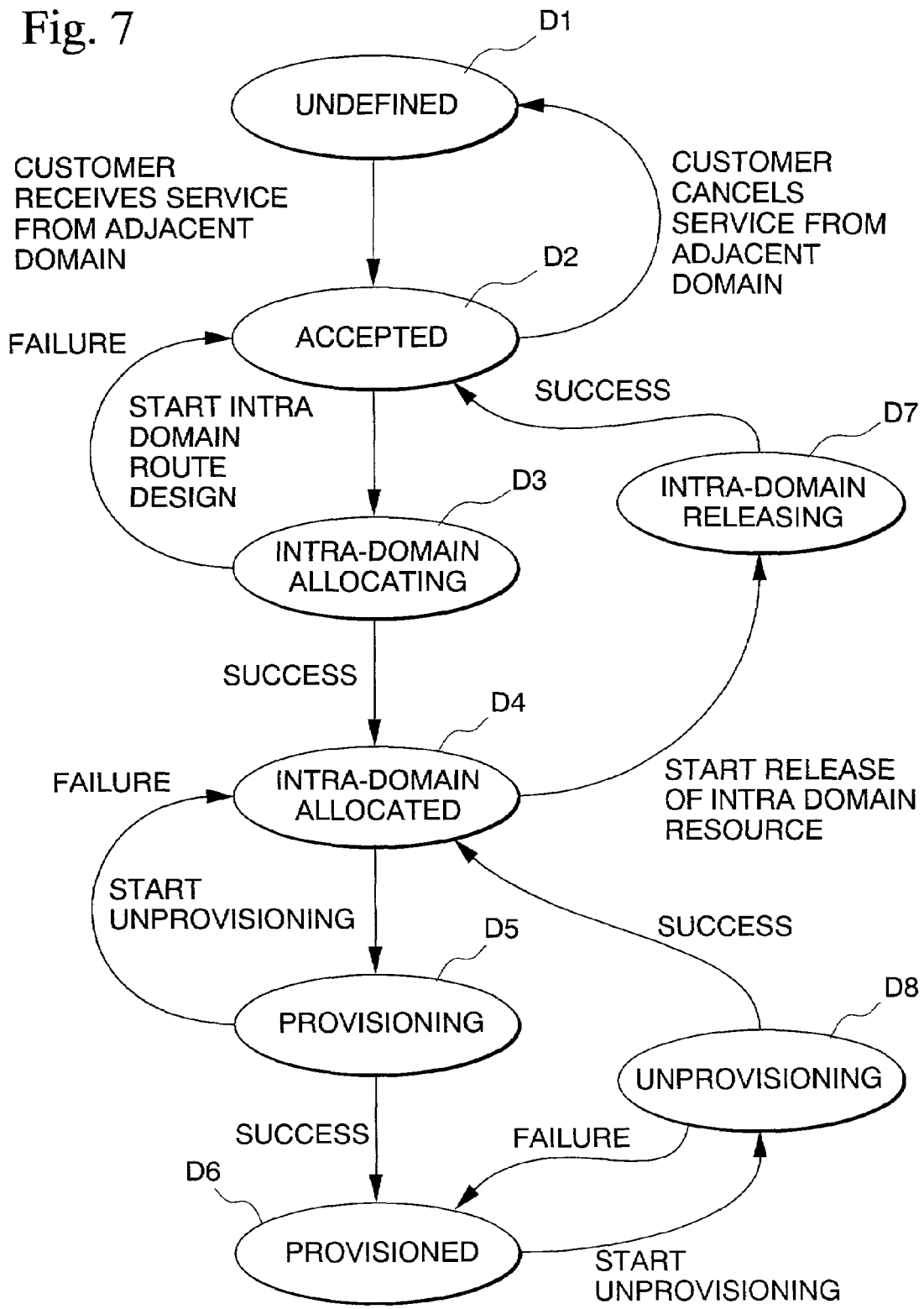
FIG. 7 is a transition diagram of service status for the present invention.

As follows is a detailed description of the service provisioning stage with reference to FIG. 6 and FIG. 7. FIG. 6 is flowchart showing the operations of the service provisioning stage of the present invention. FIG. 7 is a transition diagram of service status relating to the present invention.

In the flowchart of FIG. 6 there are a plurality of execution blocks. The block labeled "decide on internal or external forward destination" (step C1) shown at the top of the diagram refers to processing performed by the bandwidth broker 23 or the workflow server 24.

Furthermore, the blocks labeled "decide on external forward destination" (step C2), "admission control decision" (step C5), "transmit service provisioning response" (step C3), "receive service provisioning response" (step C4), "transmit service provisioning request" (step C6), and "receive service provisioning request" (step C7), shown down the left hand side of the diagram refer to processing performed by the bandwidth broker 23.

The block labeled "design inter domain route" (step C8) is performed by the multi-domain service broker 1. The block labeled "decide on internal forward destination" (step C9) shown on the right of the diagram is performed by the workflow server 24. The block labeled "receive service" (step C10) is executed by the customer care server 25, whereas the blocks labeled "design intra domain route" (step C11) and "provisioning" (step C12) are executed by the design server 27 and the policy server 26 respectively.

Moreover, at the provisioning stage, the status of the services provided to customers in each of the domains is managed. FIG. 7 shows a transition diagram for service status.

First, a customer places a service order request with the provider A. The service order includes information on the location of the customer network and information on the communication quality. In this embodiment, service classes such as high priority and the like and required bandwidth values are declared for the customer network E and the customer network D.

In the following description, the situation is described where the multi-domain service broker 1 selects the provider B as the provider which can provide the desired communication service for the received service order at the provider A. Furthermore, in the description, the functional devices and blocks which correspond with those shown in the configurations of FIG. 2 and FIG. 3 are labeled with the same numerals, although the letters A and B are added to indicate the appropriate provider.

In the provider A, the received service order information is registered in the customer care server 25A by the operator A, using the input and output device 21A. The customer care server 25A performs a grammatical check of the data, and if the data is grammatically correct, stores the data in the service storage section 226A (step C10 of FIG. 6). Furthermore, the service status is stored as "Accepted" (state D1 of FIG. 7).

Next, a decision is made by the workflow server 24A to specify either an internal or an external forward destination (step C1).

As shown in FIG. 9, this decision on an internal or external forward destination is executed by referring to the service status stored in the service storage section 226A, using logic incorporated in the sever or the system as the program control. FIG. 9 is a logic diagram for deciding on either an internal or an external forward destination. FIG. 110 is a logic diagram for deciding an external forward destination, and FIG. 11 is a logic diagram for deciding an intra domain forward destination.

The logic for deciding a forward destination uses the service status, operation results, and the location of linkage between each of the providers interconnected in order to provide the service. The status of the service received from the customer is managed according to the service status transition diagram shown in FIG. 7, and the status of intra domain route design and service provisioning can be obtained in terms such as non-executed, successful or failed. These states are managed by the respective servers, although a configuration is also possible where a device is provided within a separate network service management device for collectively managing the aforementioned service status for each device cluster, with each of the servers then writing to, or referring to this device as necessary. Because the trigger for causing a transition in status is the execution of an operation in a device such as the customer care server, the design server or the policy server shown in FIG. 2, by referring to the service status, the server requiring processing can be determined.

Furthermore, location within the domain linkage is classified into three sections, namely the source domain, a middle domain, and the destination domain. The source domain refers to the provider network connected with the source network of the customer. The destination domain refers to the provider network connected with the destination network of the customer. The middle domain refers to a provider network located between the source domain and the destination domain which provides network resources to the customer. For example, in the case where three providers A, B, C exist, and the provider A accommodates the source network of the customer and the provider C accommodates the destination network of the customer, then the provider B is the middle domain. This information is identified and managed within the network service management device.

Furthermore, there are three possible operation results, namely "Undefined", "OK" and "NG". The result "Undefined" describes non-execution of the operation, "OK" describes a successful operation, and "NG" describes an operation failure.

In the logic for deciding on either an internal or an external forward destination according to the workflow server 24A, in the case where the current domain is the source domain AND the service status is "Accepted" AND the inter-domain route has not been designed, processing is transferred to the external system (logic L1). Here, an external system refers to an external device outside of the internal processing server cluster of the network service management device, and so processing transfers from the workflow server 24A of the provider A to the bandwidth broker 23A.

Then, the bandwidth broker 23A receives the processing and makes a decision on an external forward destination (step C2). At this point, the current domain is the source domain AND the service status is "Accepted" AND the inter-domain route has not been designed, and so the processing transfers to inter-domain route design (logic L11). In other words, a processing transfer request message is transmitted to the multi-domain service broker 1 via the external system communication device 233A.

Next, the multi-domain service broker 1 executes the inter-domain route design process (step C8). In the inter-domain route design process, the domain configuration management device 131 and the service management device 132 refer to the domain configuration storage section 121 and the service storage section 122 respectively and design a domain linkage which will satisfy the service requested by the customer.

Here the domain linkage refers to the provider network linking the source network of the customer network with the destination network. Following completion of the inter-domain route design, a response is transmitted from the multi-domain service broker 1 to the bandwidth broker 23A of the provider A.

The bandwidth broker 23A of the provider A then receives the aforementioned processing and makes a decision on either an internal or an external forward destination (step C1). At this time, the current domain is the source domain AND the service status is "Accepted" AND the inter-domain route has already been designed, and so the processing transfers to the internal system (logic L2). In other words, processing transfers to the workflow server 24A of the provider A.

Subsequently, the workflow server 24A makes a decision on an internal forward destination (step C9). At this point, the current domain is the source domain AND the service status is "Accepted" AND the inter-domain route has already been designed AND the operation result from the current domain is "Undefined", and so the processing transfers to intra domain route design (logic L31). In other words, the design server 27 designs an intra domain route which will satisfy the required communication quality (step C11).

The result of the intra domain route design process executed by the design server 27 is written into the resource storage section 224 and the policy storage section 225. In the resource storage section 224, the resource information is updated with the newly allocated network resource information from the design process. For example, if in a bandwidth of 10 Mbps, 1.5 Mbps is used and a further 1.5 Mbps is newly allocated, then this amounts to 3.0 Mbps of resource being allocated. In the policy storage section 225, the configuration data for setting the communication devices 3 within the network is written as policy.

Next, the workflow server 24A of the provider A makes a decision on either an internal or an external forward destination (step C1). At this point, the service status from the source domain to the current domain is "Intra domain Allocated" AND the service status from a downstream domain to the destination domain is "Undefined", and so the processing transfers to the external system (logic L3). In other words, the processing transfers to the bandwidth broker 23A.

Subsequently, the bandwidth broker 23A decides on an external forward destination (step C2). At this point, the current domain is not the destination domain AND the service status from the source domain to the current domain is "Intra domain Allocated" AND the service status from the downstream domain to the destination domain is "Undefined", and so the processing transfers to the admission control decision process (logic L22, step C5).

In the case of this embodiment, the linkage between the operations management network of the provider A and the operations management network of the provider B is determined around service to the customer, and so the service level agreement management device 231A of the provider A refers to the service level agreement storage section 221A and checks whether or not the service information requested by the customer can be accommodated by the services agreed upon between the provider A and the provider B. In those cases where such accommodation is impossible, an error message is displayed on the input and output device 21A and the processing ends. In those cases where the service can be accommodated, a service provisioning request is transmitted to the bandwidth broker 23B of the provider B (the bandwidth broker B) via the external system communication device 233A (step C6).

On receipt of the service provisioning request (step C7), the bandwidth broker 23B executes the logic for deciding on either an internal or an external forward destination (step C 1). At this point, the current domain is not the source domain AND the service status of the current domain is "Accepted" AND the operation result is "Undefined", and so the processing transfers to the internal system (logic L4). In other words, the processing transfers to the workflow server 24B.

The workflow server 24B then executes the logic for deciding on an internal forward destination (step C9). At this point, the current domain is the source domain AND the service status is "Accepted" AND an inter-domain route has already been designed AND the operation result from the current domain is "Undefined", and so processing transfers to intra domain route design (logic L31).

Next, the design server 27B designs an intra domain route which will satisfy the required communication quality (step C11), and then transfers processing to the workflow server 24B.

The workflow server 24B then executes the logic for deciding on either an internal or an external forward destination (step C1).

At this point, the current domain is not the source domain AND the service status for all domains is "Intra domain Allocated", and so processing transfers to the external system (logic L5). In other words, the processing transfers to the bandwidth broker 23B.

Subsequently, the bandwidth broker 23B executes the logic for deciding an external forward destination (step C2). The domain route management device 232B inside the bandwidth broker 23B acquires, from the domain configuration storage section 222B, the domain linkage information needed to achieve the service to be provided to the customer. In the case of this embodiment, the linkage between the operations management network of the provider A and the operations management network of the provider B is registered, and so a service provisioning response is transmitted to the network service management device cluster 2A, namely to the bandwidth broker 23A (step C3).

On receipt of the service provisioning response from the bandwidth broker 23B via the external system communication device (step C4), the bandwidth broker 23A executes the logic for deciding on either an internal or an external forward destination (step C1).

In the case of this embodiment, at this point the current domain is the source domain AND the service status for all domains is "Intra domain Allocated", and so processing transfers to the internal system (logic L6). In other words, processing transfers to the workflow server 24A via the internal system communication device of the bandwidth broker 23A.

Next, the workflow server 24A decides on an internal forward destination within the network service management device cluster 2A (step C9). At this point, the current domain is the source domain AND the service status for all domains is "Intra domain Allocated", and so the next process is provisioning (logic L32). In other words, processing transfers to the policy server 26A. At this time, the objective service ID is passed from the workflow server 24A to the policy server 26A.

The policy server 26A uses the service ID as a key and reads the configuration data for the communication devices required for providing the desired service from the policy storage section 225A. In the case of this embodiment, the policy server 26A conducts provisioning on the operations management network of the provider A.

Next, the policy server 26A converts the read policy data to configuration data specific to the communication device, and executes provisioning (step C12). Typically, setting commands and data for the communication device 3 will vary depending on the maker of the communication device, but policy data is configuration data which is independent of each communication device.

Consequently, the policy server converts the policy data into setting commands and data which correspond with each of the communication devices, and then executes provisioning. If provisioning succeeds, then the service status of the current domain is changed from "Intra domain Allocated" to "Provisioned", and then stored in the service storage section 226. Furthermore, the operation result for the current domain provisioning is subsequently treated as "OK".

Once the policy server 26A has executed provisioning, the processing transfers to the workflow server 24A, and a decision is made on either an internal or an external forward destination (step C1). In the case of this embodiment, at this point the service status from the source domain to the current domain is "Provisioned" AND the service status from the downstream domain to the destination domain is "Intra domain Allocated", AND the operation result for the downstream domain is "Undefined", and so the processing transfers to the external system (logic L7). In other words, the processing transfers from the workflow server 24A to the bandwidth broker 23A.

Next, the bandwidth broker 23A executes the logic for deciding an external forward destination (step C2). In this embodiment, at this point the current domain is not the source domain AND the service status for all the domains is "Intra domain Allocated", and so the next process is the service provisioning request transmission process (logic L23).

The bandwidth broker 23A acquires, from the domain configuration storage section 222A, the linkage information for those domains which are passed through in order to provide the service. In the case of this embodiment, the linkage is between the operations management network of the provider A and the operations management network of the provider B, and so the bandwidth broker 23A transmits a service provisioning request message for transferring the processing to the bandwidth broker 23B (step C6).

On receipt of the service provisioning request message (step C7), the bandwidth broker 23B checks whether or not the message is grammatically correct.

If the message is grammatically correct, then the bandwidth broker 23B executes the logic for deciding on either an internal or an external forward destination (step C1). At this point, in this embodiment, the service status from the source domain to the upstream domain is "Provisioned" AND the service status from the current domain to the destination domain is "Intra domain Allocated", AND the provisioning operation result for the current domain is "Undefined", and so the processing transfers to the internal system (logic L8). In other words, the processing transfers to the workflow server 24B via the internal system communication device 235.

The workflow server 24B then executes the logic for deciding on an internal forward destination within the network service management device cluster B (step C9).

In the case of this embodiment, at this point the service status from the source domain to the upstream domain is "Provisioned" AND the service status from the current domain to the destination domain is "Intra domain Allocated", AND the operation result for the current domain is "Undefined", and so the next process is provisioning (logic L33). In other words, processing transfers to the policy server 26B. At this time, the service ID which is the object of the provisioning process passes to the policy server 26B.

The policy server 26B uses the service ID as a key and reads the policy data for the service from the policy storage section 225B. The policy server 26B then executes provisioning on those communication devices 3 within the operations management network of the provider B which relate to the service, and then updates the service status based on the results of the provisioning. If the provisioning succeeds, then the service status is changed to "Provisioned" and the processing transfers to the workflow server 24B.

The workflow server 24B of the provider B then executes the logic for deciding on either an internal or an external forward destination (step C1). In the case of this embodiment, there are multiple domains AND the current domain is not the source domain AND the service status of all the domains is "Provisioned", and so the processing transfers to the external system (logic L9). In other words, the processing transfers from the workflow server 24B to the bandwidth broker 23B.

On receipt of the message from the workflow server 24B, the bandwidth broker 23B executes the logic for deciding an external forward destination (step C2). In this embodiment, at this point the current domain is not the source domain AND the service status for all the domains is "Provisioned", and so the next process is the service provisioning response transmission process (logic L25).

The bandwidth broker 23B acquires the domain linkage information needed to achieve the service from the domain configuration storage section 222B. In this embodiment the upstream domain from the operations management network of the provider B is the provider A, and so the bandwidth broker 23B transmits a service provisioning response message to the bandwidth broker 23A via the external system communication device 233 (step C3).

On receipt of the service provisioning response message from the bandwidth broker 23B (step C4), the bandwidth broker 23A executes the logic for deciding on either an internal or an external forward destination (step C1). In the case of this embodiment, there are multiple domains AND the current domain is the source domain AND the service status of all the domains is "Provisioned", and so the processing transfers to the internal system (logic L10). In other words, the processing transfers from the bandwidth broker 23A to the workflow server 24A.

Next, the workflow server 24A executes the logic for deciding on an intra domain forward destination (step C9). In the case of this embodiment, at this point the current domain is the source domain AND the service status of all the domains is "Provisioned", and so the processing finishes (logic L34).

As described above, by making the network service management device cluster 2A of the provider A and the network service management device cluster 2B of the provider B cooperate in the execution of a service registration stage, a service agreement stage and a service provisioning stage, network service can be provided via a plurality of domains.

What is claimed is:

1. A quality assured network service provision system compatible with a multi-domain network, wherein
a communication network comprising a plurality of operations management networks (domains) which are connected to a plurality of customer networks with user terminals and which are respectively managed by different providers, the system comprising:
a network service management device incorporated within an operations management network of each of said providers, and negotiating with another operations management network which is managed by another provider and with which interconnection is to be established based on a required quality level from a customer so as to ensure an end-to-end quality level; and
a service broker device at a functional host layer of said network service management device the service broker device receiving service information on services which can be provided by the respective domains and domain information which are output from the network service management device which belongs to each of the providers, storing information on the operations management networks managed by the respective providers, and brokering a service level agreement between the operations management networks of said plurality of providers by selecting route information and a network service management device for ensuring an end-to-end quality level required by the customer based on the received service information and domain information;
wherein said network service management device comprises an outputting device for outputting the service information on services which can be provided by each of said providers and the domain information to a multi-service broker, and said service broker device comprises a device for storing output information from each network service management device, selecting a network service management device of a domain which will satisfy the required quality level when a network service request is generated by the customer, and issuing instructions for introducing and setting domain information which satisfies the service level agreement; wherein said network service management device comprises: an input and output device for input, by an operator, of the service information on services which can be provided by said provider and domain information made up of configuration information about an operations management network of said provider;

storage devices for storing information input from said input and output device by information type;

a workflow server for determining transfer destinations for processing commands from among a customer care server, a design server, a policy server, and a bandwidth broker, which form a network service management device cluster, based on each service request from a customer;

the bandwidth broker for registering said domain information and service information in said service broker device, and determining, in cooperation with said workflow server, whether a subject for executing a subsequent process due to the service request from the customer is the service broker device which is an external system or the network service management device cluster which is an internal system; and an internal processing system for detecting setting information for a communication device and the status of provisioning, and performing setting and control so as to satisfy the required quality level from the customer.

2. The quality assured network service provision system compatible with a multi-domain network according to claim 1, wherein said bandwidth broker and said workflow server have a means for deciding, based on logic, whether the subject for executing a subsequent process due to the customer service request is in the external system or the internal system, said bandwidth broker has a means for deciding a domain in cases where the subject for executing a subsequent process is in the external system, and said workflow server has a means for deciding an internal processing system of a forward destination in cases where the subject for executing a subsequent process is in the internal system.

3. The quality assured network service provision system compatible with a multi-domain network according to claim 1, wherein said service broker device has: a means for referring to the service information which can be provided by the respective domains which is output from the network service management device and stored in a service storage section, the service information including resource information managed by the design server, provisioning information managed by the policy server, and network configuration information, and deciding whether the subject for executing the subsequent process due to the customer service request is the service broker device which is the external system or the network service management device cluster which is the internal system;

a means for deciding an external forward destination in cases where the subject for executing a subsequent process is in the external system; and a means for deciding an internal processing system of a forward destination from among the customer care server, the design server, the policy server, and the bandwidth broker in cases where the subject for executing a subsequent process is in the internal system.

4. The quality assured network service provision system compatible with a multi-domain network according to claim 1, wherein said internal system comprises: the customer care server; the design server; the policy server; and a network management device, the customer care server manages service order information received from customers, the design server manages network resources of an operations management network of a provider, the policy server reads pre-recorded policy information, as well as converts said policy information into the setting information for a communication device of a specific vendor, and performs provisioning of a communication device for the provision of a service, and the network management device provides a network fault management function for a configuration management and open channel incorporating communication devices within an operations management network of a provider and connection configuration of circuitry for connecting said communication devices, each of which is connected to said workflow server.

* * * * *